United States Patent
Tatsuwaki et al.

(10) Patent No.: US 10,730,380 B2
(45) Date of Patent: Aug. 4, 2020

(54) VEHICLE BODY REAR STRUCTURE

(71) Applicant: HONDA MOTOR CO., LTD., Tokyo (JP)

(72) Inventors: Masaaki Tatsuwaki, Wako (JP); Hideki Tai, Wako (JP); Junya Harada, Wako (JP); Daisuke Matsunaga, Wako (JP); Shinji Kumagai, Wako (JP); Yoshikazu Inoue, Wako (JP); Yoshihiro Kobayashi, Wako (JP); Shouji Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/354,269

(22) Filed: Mar. 15, 2019

(65) Prior Publication Data

US 2019/0283563 A1  Sep. 19, 2019

(30) Foreign Application Priority Data

Mar. 19, 2018  (JP) ................... 2018-050726

(51) Int. Cl.
*B60K 1/04* (2019.01)
*B62D 25/20* (2006.01)
*B60L 50/60* (2019.01)

(52) U.S. Cl.
CPC .............. *B60K 1/04* (2013.01); *B60L 50/66* (2019.02); *B62D 25/2027* (2013.01); *B60K 2001/0416* (2013.01); *B60K 2001/0438* (2013.01)

(58) Field of Classification Search
CPC ............. B60K 1/04; B60K 2001/0416; B60K 2001/0438; B60L 50/50; B60L 50/64; B60L 50/66; B62D 25/2027; B62D 25/20

USPC ......................................................... 180/68.5
See application file for complete search history.

(56) References Cited

U.S. PATENT DOCUMENTS

| 6,227,322 | B1* | 5/2001 | Nishikawa | B60R 16/04 180/65.1 |
| 8,210,301 | B2* | 7/2012 | Hashimoto | B60K 1/04 180/68.5 |
| 8,881,853 | B2* | 11/2014 | Nitawaki | B60K 1/04 180/68.5 |
| 2013/0248267 | A1 | 9/2013 | Nitawaki | |

(Continued)

FOREIGN PATENT DOCUMENTS

| JP | 2003-002249 A | 1/2003 |
| JP | 2013-199196 A | 10/2013 |

OTHER PUBLICATIONS

Japanese Office Action (English translation is not available) dated Sep. 17, 2019 (4 pages).

*Primary Examiner* — John D Walters
(74) *Attorney, Agent, or Firm* — Rankin, Hill & Clark LLP

(57) ABSTRACT

A vehicle body rear structure includes: a pair of left and right rear side frames extending in a vehicle front-rear direction; a vehicle-mounted component provided between the pair of rear side frames; and a pair of support members for supporting the vehicle-mounted component. The support members respectively extend along the rear side frames and in the vehicle front-rear direction, and are respectively arranged side-by-side with the rear side frames in a vehicle width direction and inwardly of the rear side frames in the vehicle width direction.

7 Claims, 6 Drawing Sheets

(56) References Cited

U.S. PATENT DOCUMENTS

2015/0180078 A1\* 6/2015 Ikeda ............... B60L 50/72
                                                    180/68.5
2018/0050607 A1\* 2/2018 Matecki ............ B60L 50/66

\* cited by examiner

VEHICLE BODY REAR STRUCTURE

CROSS-REFERENCE TO RELATED APPLICATIONS

The present application claims priority under 35 U.S.C. § 119 to Japanese Patent Application No. 2018-050726, filed Mar. 19, 2018, the contents of which are hereby incorporated by reference in their entirety.

BACKGROUND OF THE INVENTION

1. Field of the Invention

The present invention relates to a vehicle body rear structure.

2. Description of the Related Art

There is a vehicle body rear structure for an automobile which includes: a pair of left and right rear side frames extending in a vehicle front-rear direction of a vehicle body; a battery provided between the pair of rear side frames; and a support frame provided under the rear side frames and surrounding the battery (see Japanese Laid-open Patent Publication No. 2013-199196). The support frame is connected to lower portions of the rear side frames using connectors which extend in an up-down direction of the vehicle body.

SUMMARY OF THE INVENTION

Problem to be Solved by Invention

In the vehicle body rear structure, the rear side frames and the support frame are offset to each other in the up-down direction. The support frame, therefore, turns around a vertical axis in a case where a collision load is applied mainly on one of the rear side frames than evenly on both the left and right rear side frames in the event of an offset rear collision. This makes it difficult to transmit the collision load to the other rear side frame via the support frame.

From this viewpoint, an object of the present invention is to provide a vehicle body rear structure which is capable of transmitting a collision load to a rear side frame on the side opposite to the collision side in the event of an offset rear collision.

Solution to Problem

To solve the above problem, the vehicle body rear structure according to the present invention includes: a pair of left and right rear side frames extending in a vehicle front-rear direction; a vehicle-mounted component provided between the pair of rear side frames; and a pair of support members for supporting the vehicle-mounted component. The support members respectively extend along the rear side frames and in the vehicle front-rear direction, and are respectively arranged side-by-side with the rear side frames in a vehicle width direction and inwardly of the rear side frames in the vehicle width direction.

Advantageous Effect of the Invention

The vehicle body rear structure according to the present invention is capable of transmitting a collision load to a rear side frame on the side opposite to the collision side in the event of an offset rear collision.

DETAILED DESCRIPTION OF THE EMBODIMENTS

Figure 1:
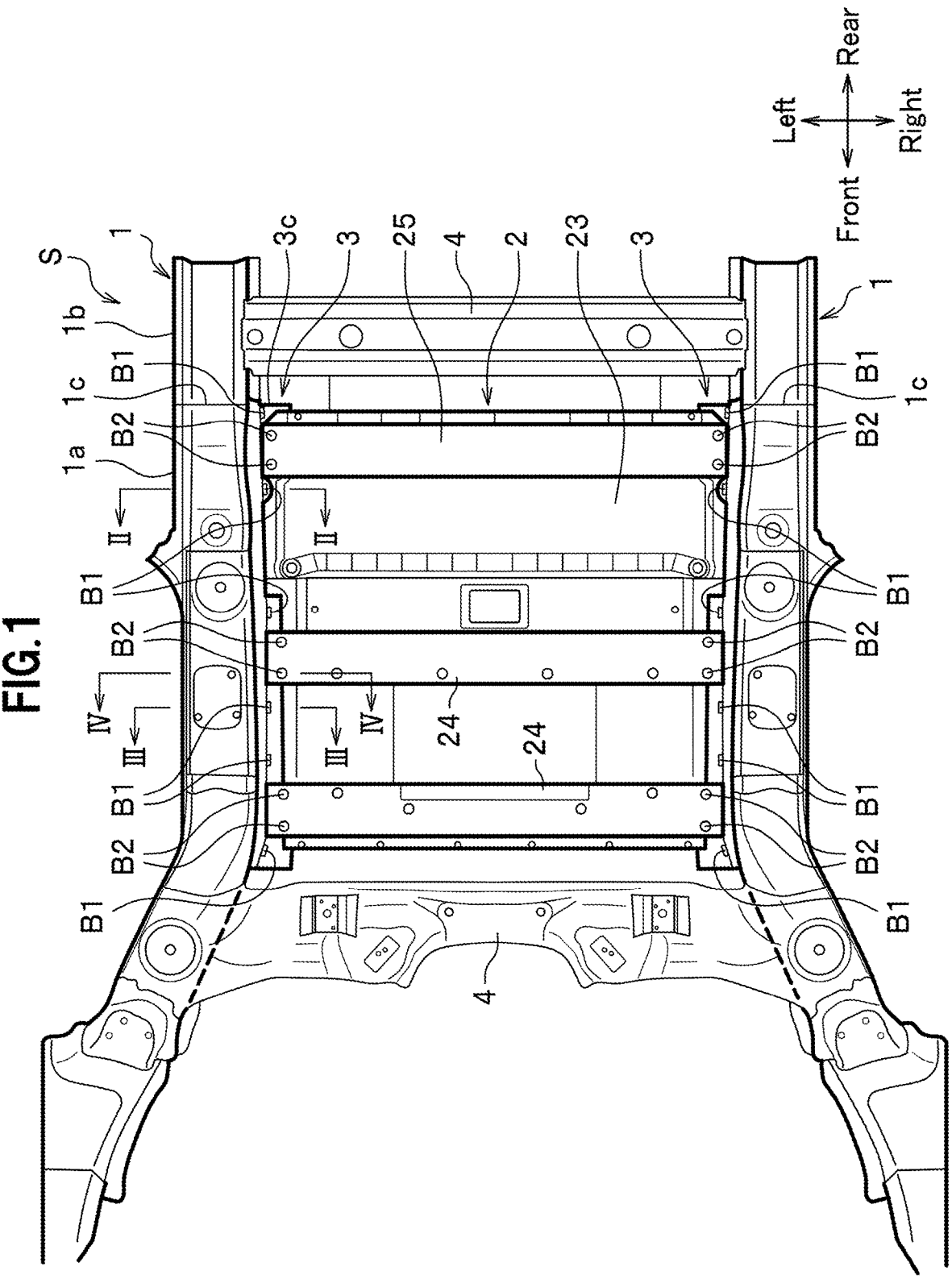
FIG. 1 is a bottom view showing a vehicle body rear structure according to an embodiment of the present invention.

An embodiment of the present invention will be hereinafter described in detail with reference to the accompanying drawings depending on the necessity. Incidentally, "front-rear," "up-down" and "left-right" indicated with arrows in the drawings represent a vehicle front-rear direction of a vehicle body, an up-down direction of the vehicle body, and a left-right direction (a vehicle width direction) seen from a driver's seat, respectively. A vehicle body rear structure S of the present embodiment has a structure which is symmetric in the left-right direction (vehicle width direction) with respect to a center of the width of the vehicle.

As illustrated in FIG. 1, the vehicle body rear structure S for a vehicle according to the embodiment of the present invention includes: a pair of left and right rear side frames 1, 1; a battery 2; and a pair of left and right support members 3, 3. Cross members 4, 4 are arranged respectively on the front and rear sides of the battery 2, and each extend in the vehicle width direction and connect between the left and right rear side frames 1, 1. In the embodiment, the vehicle is an electric automobile, a hybrid automobile or the like, which runs using an electric motor (not illustrated) as a power source.

Rear Side Frame

Figure 2:
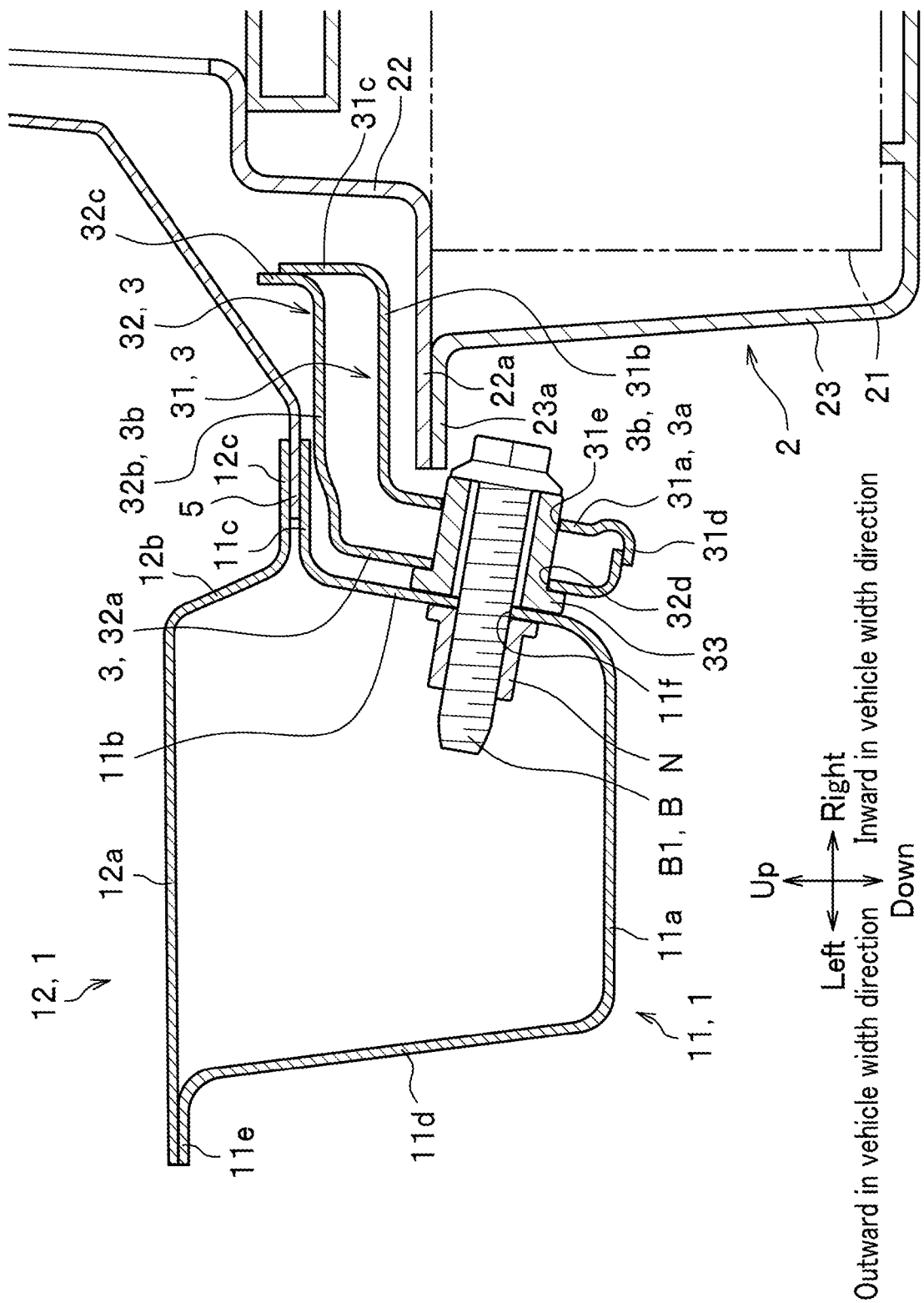
FIG. 2 is a cross-sectional view taken along line II-II in FIG. 1.

Each rear side frame 1 is a metal structural member extending in the vehicle front-rear direction. As illustrated in FIG. 2, the rear side frame 1 has a hollow structure having a rectangular closed cross section. The rear side frame 1 includes a rear side lower 11, and a rear side upper 12.

The rear side lower 11 is a plate-like member located under the rear side upper 12. The rear side lower 11 forms a lower wall portion of the rear side frame 1, a lower portion of an inner wall portion of the rear side frame 1, and an outer wall portion of the rear side frame 1. The rear side lower 11 has a substantially hat-shaped cross section that opens upward. The rear side lower 11 integrally includes a lower bottom wall portion 11a, a lower inner wall portion 11b, a lower inner flange 11c, a lower outer wall portion 11d, and a lower outer flange 11e.

The lower bottom wall portion 11a forms the lower wall portion of the rear side frame 1, and extends in the vehicle width direction and in the vehicle front-rear direction.

The lower inner wall portion 11b forms the lower portion of the inner wall portion of the rear side frame 1, and extends in the up-down direction and in the vehicle front-rear direction. The lower inner wall portion 11b extends upward from a vehicle width direction inner end portion of the lower bottom wall portion 11a. A through-hole 11f penetrates through the lower inner wall portion 11b in the vehicle width direction, and a bolt B is inserted through the through-hole 11f.

The lower inner flange 11c extends inward in the vehicle width direction from an upper end portion of the lower inner wall portion 11b, and extends in the vehicle front-rear direction.

The lower outer wall portion 11d forms the outer wall portion of the rear side frame 1, and extends in the up-down direction and in the vehicle front-rear direction. The lower outer wall portion 11d extends upward from a vehicle width direction outer end portion of the lower bottom wall portion 11a.

The lower outer flange 11e extends outward in the vehicle width direction from an upper end portion of the lower outer wall portion 11d, and extends in the vehicle front-rear direction. Incidentally, the lower outer flange 11e is formed on a rear portion of the rear side lower 11, but not on a front portion of the rear side lower 11 (see FIGS. 3 and 4).

The rear side upper 12 is a plate-like member located on the upper side of the rear side lower 11. The rear side upper 12 forms an upper wall portion of the rear side frame 1 and an upper part of the inner wall portion of the rear side frame 1. The rear side upper 12 closes an upper end opening of the rear side lower 11. The rear side upper 12 has a substantially crank-shaped cross section. The rear side upper 12 integrally includes an upper top wall portion 12a, an upper inner wall portion 12b, and an upper inner flange 12c.

The upper top wall portion 12a forms the upper wall portion of the rear side frame 1, and extends in the vehicle width direction and in the vehicle front-rear direction. A rear portion of the upper top wall portion 12a is fixed to the lower outer flange 11e by welding or the like, on the vehicle width direction outer side of the upper top wall portion 12a. A front portion of the upper top wall portion 12a is bent upward on the vehicle width direction outer side thereof, and is fixed to the lower outer wall portion 11d by welding or the like (see FIGS. 3 and 4).

The upper inner wall portion 12b forms the upper portion of the inner wall portion of the rear side frame 1 so that the upper inner wall portion 12b and the lower inner wall portion 11b together form the inner wall portion of the rear side frame 1, and extends in the up-down direction and in the vehicle front-rear direction. The upper inner wall portion 12b extends downward from a vehicle width direction inner end portion of the upper top wall portion 12a.

The upper inner flange 12c extends inward in the vehicle width direction from a lower end portion of the upper inner wall portion 12b, and extends in the vehicle front-rear direction. The upper inner flange 12c is fixed to the lower inner flange 11c by welding or the like with an edge portion of a rear floor panel 5 interposed therebetween.

As illustrated in FIG. 1, each rear side frame 1 includes a forwardly located protective section 1a and a rear extension section 1b located rearwardly of the protective section 1a. Reference sign 1c denotes a boundary between the protective section 1a and the rear extension section 1b. That is, the reference sign 1c denotes a rear end portion of the protective section 1a and denotes a front end portion of the rear extension section 1b.

The protective section 1a is located side-by-side with the battery 2 in the vehicle width direction and has a high compressive strength against a collision load in the vehicle front-rear direction. The rear extension section 1b extends rearward from the rear end portion of the protective section 1a and has a lower compressive strength against the collision load in the vehicle front-rear direction than the protective section 1a. The difference in the strength between the protective section 1a and the rear extension section 1b is provided, for example, by reinforcement means such as ribs, by through-holes, by plate thickness, and/or by selection of materials.

Figure 3:
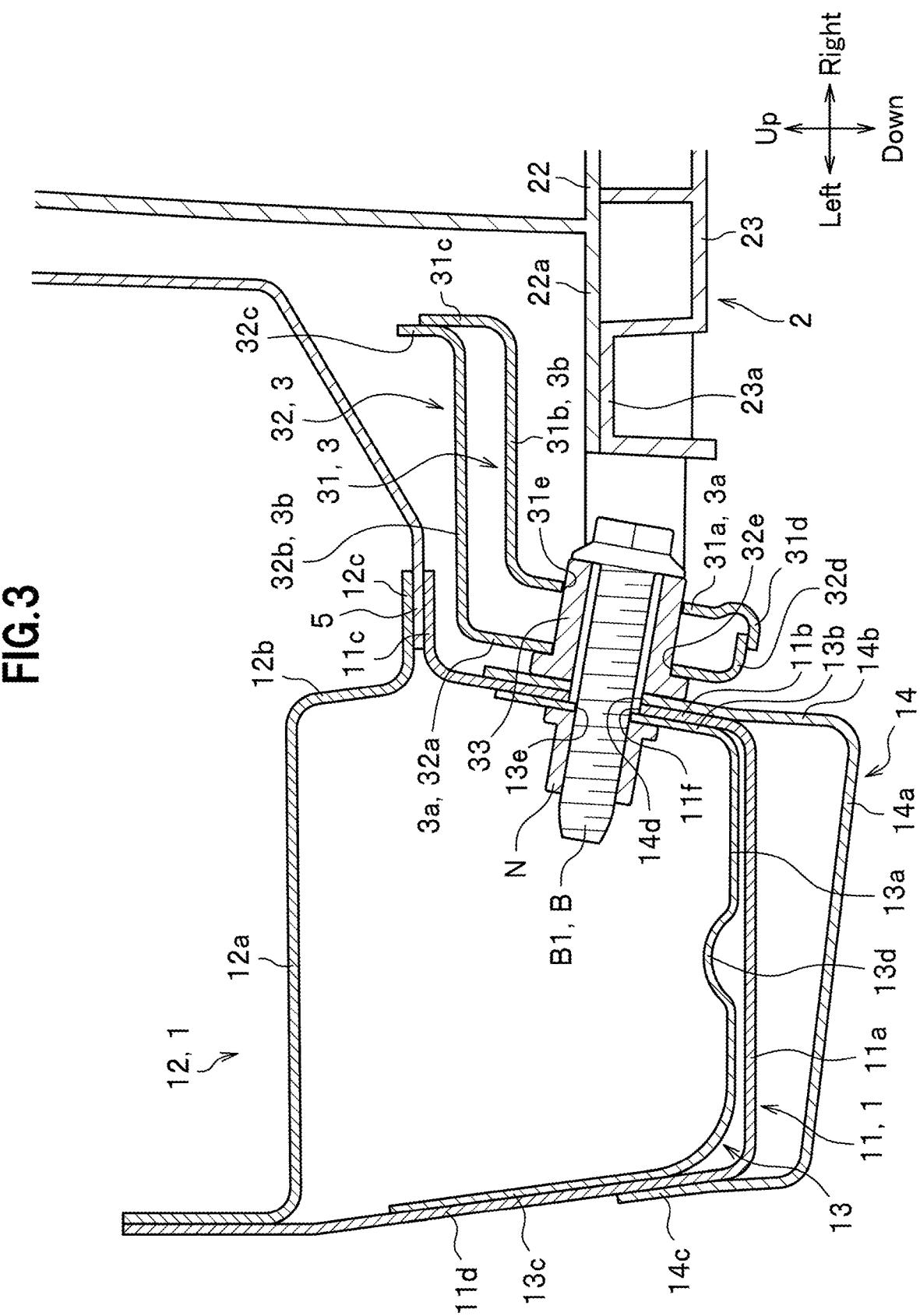
FIG. 3 is a cross-sectional view taken along line III-III in FIG. 1.

As illustrated in FIG. 3, each rear side frame 1 has a front portion provided with a first reinforcement member 13 and a second reinforcement member 14 for reinforcing the protective section 1a.

The first reinforcement member 13 is a metal plate-like member disposed inside a closed space defined by the rear side lower 11 and the rear side upper 12. The first reinforcement member 13 has a substantially U-shaped cross-section that opens upward. The first reinforcement member 13 integrally includes a first lower wall portion 13a, a first inner wall portion 13b, and a first outer wall portion 13c.

The first lower wall portion 13a forms a lower wall portion of the first reinforcement member 13 and extends in the vehicle width direction and in the vehicle front-rear direction. The first lower wall portion 13a is disposed above the lower bottom wall portion 11a. An upwardly projecting bead 13d is formed on the first lower wall portion 13a at a portion thereof located substantially centrally relative to the width of the first lower wall portion 13a along the vehicle width direction. The bead 13d has an arc-shaped cross section.

The first inner wall portion 13b forms an inner wall portion of the first reinforcement member 13 and extends in the up-down direction and in the vehicle front-rear direction. The first inner wall portion 13b extends upward from a vehicle width direction inner end portion of the first lower wall portion 13a and is overlapped with the lower inner wall portion 11b. A through-hole 13e penetrates through the first inner wall portion 13b in the vehicle width direction, and a bolt B is inserted through the through-hole 13e. A nut N is welded to a vehicle width direction outer edge portion of the through-hole 13e.

The first outer wall portion 13c forms an outer wall portion of the first reinforcement member 13 and extends in the up-down direction and in the vehicle front-rear direction. The first outer wall portion 13c extends upward from a vehicle width direction outer end portion of the first lower wall portion 13a, and is fixed to the lower outer wall portion 11d by welding or the like.

The second reinforcement member 14 is a metal plate-like member that is disposed between the left and right sides of the rear side lower 11 to extend under the rear side lower 11. The second reinforcement member 14 has a substantially U-shaped cross section that opens upward. The second reinforcement member 14 integrally includes a second lower wall portion 14a, a second inner wall portion 14b and a second outer wall portion 14c.

The second lower wall portion 14a forms a lower wall portion of the second reinforcement member 14 and extends in the vehicle width direction and in the vehicle front-rear direction. The second lower wall portion 14a is disposed under the lower bottom wall portion 11a.

The second inner wall portion 14b forms an inner wall portion of the second reinforcement member 14 and extends in the up-down direction and in the vehicle front-rear direction. The second inner wall portion 14b extends upward from a vehicle width direction inner end portion of the second lower wall portion 14a and is overlapped with the lower inner wall portion 11b. A through-hole 14d penetrates through the second inner wall portion 14b in the vehicle width direction, and the bolt B is inserted through the through-hole 14d.

The second outer wall portion 14c forms an outer wall portion of the second reinforcement member 14 and extends in the up-down direction and in the vehicle front-rear direction. The second outer wall portion 14c extends upward from a vehicle width direction outer end portion of the second lower wall portion 14a, and is fixed to the lower outer wall portion 11d and the first outer wall portion 13c by welding or the like.

Battery

The battery 2 is a vehicle-mounted component disposed between the pair of rear side frames 1, 1. The battery 2, illustrated in FIG. 2, includes: a battery main body 21 for supplying electric power to a power source; and an upper case 22 and a lower case 23 in which to house the battery main body 21. Incidentally, FIG. 2 schematically illustrates the battery main body 21 with a chain double-dashed line.

Figure 4:
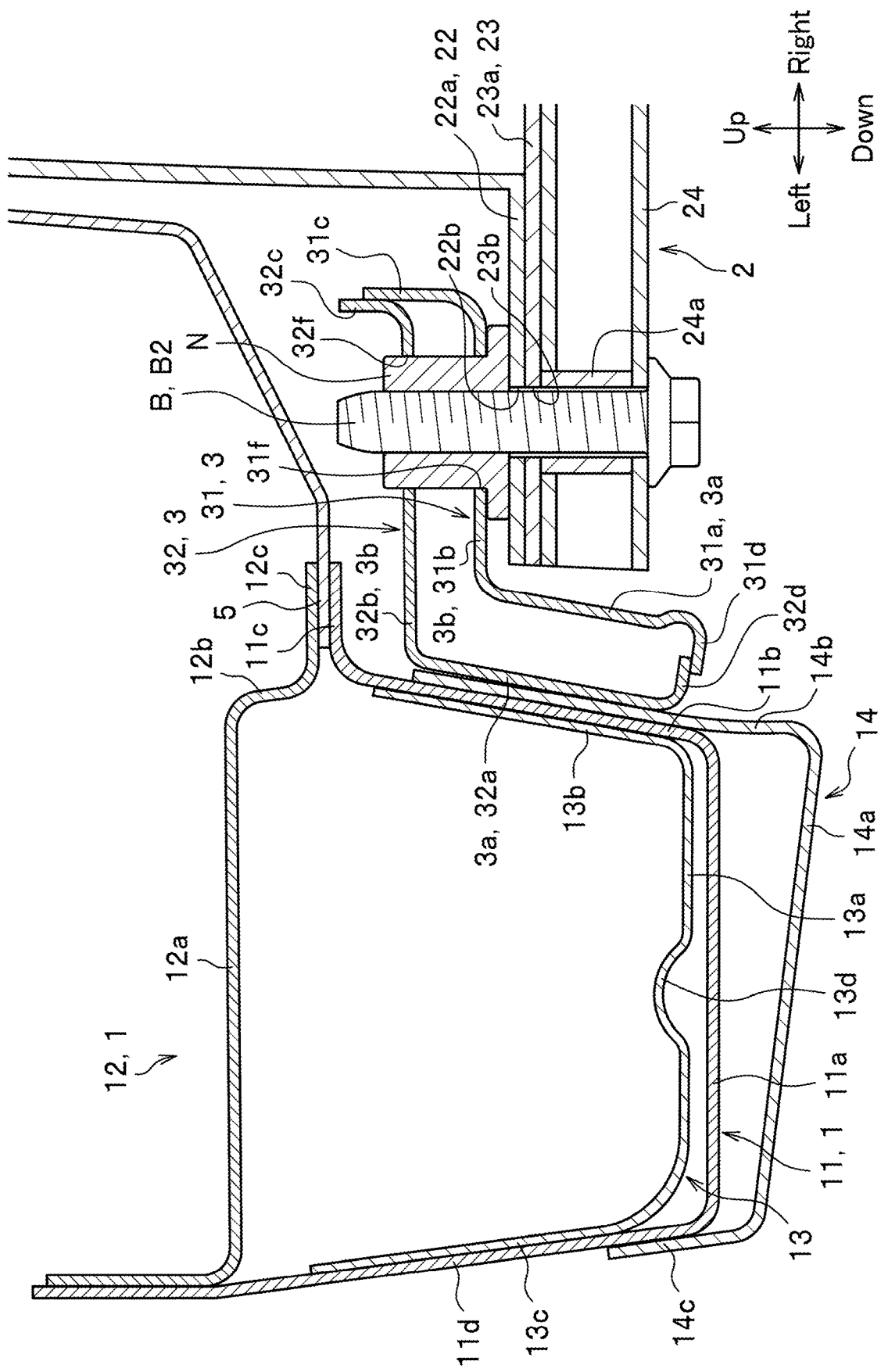
FIG. 4 is a cross-sectional view taken along line IV-IV in FIG. 1.

The lower case 23 is a member made of a resin or of a metal. The lower case 23 includes a rear portion having a recessed shape which is open upward (see FIG. 2) and a front portion having a substantially horizontal plate shape (see FIGS. 3 and 4). The battery main body 21 is disposed in a recessed portion of the rear portion of the lower case 23. The upper case 22 is a member made of a resin or of a metal and formed in a recessed shape which is open downward. The upper case 22 is attached to an upper end of the lower case 23. As illustrated in FIG. 4, the upper case 22 and the lower case 23 respectively include case flanges 22a, 23a extending in the vehicle width direction. The case flanges 22a, 23a respectively have through-holes 22b and through-holes 23b to form coaxial pairs of through holes each of which penetrates the case flanges 22a, 23a in the up-down direction, and bolts B are respectively inserted through the pairs. The upper case 22 and the lower case 23 are fastened to each other by the bolts B fastening the case flanges 22a, 23a together.

As illustrated in FIG. 1, the battery 2 has load transmission members 24 and a horizontal rib member 25. Each load transmission member 24 is a member for transmitting a load from one side to the other side of the load transmission member 24 in the vehicle width direction. Each load transmission member 24 extends in the vehicle width direction under a lower surface of the lower case 23 and on a front side thereof. Each load transmission member 24 is arranged forwardly of a vehicle front-rear direction center of the battery 2. The number of the load transmission members 24 is not particularly limited. In the present embodiment, two load transmission members 24 are spaced apart from each other in the vehicle front-rear direction. No particular limitation is imposed on the configuration of each load transmission member 24 as long as the configuration allows the load transmission member 24 to transmit the load. In the present embodiment illustrated in FIG. 4, the load transmission members 24 are each a beam separate from the lower case 23. No particular limitation is imposed on the material, shape and the like of the beam. In this present embodiment, the beam is formed of an extruded material made of an aluminum alloy and has a tubular shape with a rectangular cross-section.

The load transmission members 24 and the case flanges 22a, 23a are arranged at the same position in the up-down direction as the rear side frames 1 (rear side lower 11). In other words, the load transmission members 24 and the case flanges 22a, 23a are arranged side-by-side with the rear side frames 1 in the vehicle width direction in cross-sectional view seen along the vehicle width direction. The load transmission members 24 and the case flanges 22a, 23a are arranged at the same position in the up-down direction as vertical walls 3a of later-described support members 3. That is, The load transmission members 24 and the case flanges 22a, 23a are arranged side-by-side with the vertical walls 3a in the vehicle width direction in cross-sectional view taken along the vehicle width direction. The load transmission members 24 and the case flanges 22a, 23a are arranged apart from the vertical walls 3a in the vehicle width direction with gaps interposed therebetween. The load transmission members 24 and the case flanges 22a, 23a face the rear side frames 1 with the vertical walls 3a interposed therebetween. The load transmission members 24 and the case flanges 22a, 23a are arranged under horizontal walls 3b of the support members 3 described later. Each load transmission member 24 has penetration holes 24a, each of which penetrates the load transmission member 24 in the up-down direction and through each of which a bolt B is inserted. Each penetration hole 24a includes through-holes formed in upper and lower walls of the load transmission member 24 and a collar making the upper and lower through-holes communicate with each other. Incidentally, the load transmission members 24 may each be a rib or the like which is provided integrally with the lower case 23 and which extends in the vehicle width direction.

The horizontal rib member 25 extends in the vehicle width direction under the lower surface of the lower case 23 and on a rear side thereof. The horizontal rib member 25 is arranged rearward of the vehicle front-rear direction center of the battery 2. The number of horizontal rib members 25 is not specifically limited. In the present embodiment, the single horizontal rib member 25 is provided. No particular limitation is imposed on the configuration of the horizontal rib member 25. In the present embodiment, the horizontal rib member 25 has the same configuration of the load transmission members 24.

Support Members

As illustrated in FIGS. 3 and 4, support members 3 are each a metal member extending in the vehicle front-rear direction between the battery 2 and corresponding one of the rear side frames 1. Each support member 3 extends in the vehicle front-rear direction along the corresponding rear side frame 1, and is arranged side-by-side with the corresponding rear side frame 1 and inwardly thereof, in the vehicle width direction. Each support member 3 is located at a position overlapping the corresponding rear side frame 1 as seen from the vehicle width direction. That is, each support member 3 is located at the same position in the up-down direction as the corresponding rear side frame 1, inwardly of the corresponding rear side frame 1 in the vehicle width direction. The support members 3 support the battery 2 by hanging the battery 2 from the rear side frames 1. The support members 3 are covered by the rear floor panel 5 from above. A rear end portion 3c of each support member 3 and a rear end portion 1c of the corresponding protective section 1a are arranged side-by-side in the vehicle width direction (see FIG. 5). The support members 3 are each formed, for example, by combining multiple steel plates into a hollow structure with an L-shaped closed cross section. Each support member 3 has a first support member 31 and a second support member 32.

The first support member 31 is a metal plate-like member that forms a part of a vertical wall and a part of a horizontal wall of the support member 3. The first support member 31 integrally includes a first vertical wall 31a, a first horizontal wall 31b, and first flanges 31c, 31d.

The first vertical wall 31a forms an inner side of the vertical wall of the support member 3, and extends in the up-down direction and in the vehicle front-rear direction. As illustrated in FIG. 3, the first vertical wall 31a has through-holes 31e each of which penetrates through the first vertical wall 31a in the vehicle width direction.

The first horizontal wall 31b forms a lower side of the horizontal wall of the support member 3, and extends in the vehicle width direction and in the vehicle front-rear direction. The first horizontal wall 31b extends inward in the vehicle width direction from an upper end portion of the first vertical wall 31a. Each first support member 31 has a substantially L-shaped portion which is formed between the first vertical wall 31a and the first horizontal wall 31b. As illustrated in FIG. 4, the first horizontal wall 31b has through-holes 31f each of which penetrates through the first horizontal wall 31b in the up-down direction.

The first flange 31c extends upward from a vehicle width direction inner end portion of the first horizontal wall 31b and extends in the vehicle front-rear direction. The first flange 31d extends outward in the vehicle width direction from a lower end portion of the first vertical wall 31a, and extends in the vehicle front-rear direction.

The second support member 32 is a metal plate-like member that forms a part of the vertical wall and a part of the horizontal wall of the support member 3. The second support member 32 integrally includes a second vertical wall 32a, a second horizontal wall 32b, and second flanges 32c, 32d.

The second vertical wall 32a forms an outer side of the vertical wall of the support member 3, and extends in the up-down direction and in the vehicle front-rear direction. The second vertical wall 32a is spaced apart from the first vertical wall 31a outward in the vehicle width direction, and extends higher than the upper end portion of the first vertical wall 31a. The first vertical wall 31a and the second vertical wall 32a together form the vertical wall 3a extending in the up-down direction and in the vehicle front-rear direction along the rear side frame 1. The vertical wall 3a is arranged between the rear side frame 1 and the battery 2 in the vehicle width direction. The second vertical wall 32a, illustrated in FIG. 3, has through-holes 32e, each of which penetrates the second vertical wall 32a in the vehicle width direction. A flanged collar 33 is disposed through each through-hole 32e and the corresponding through-hole 31e of the first vertical wall 31a. The vertical wall 3a is in surface contact with a vehicle width direction inner surface of the rear side frame 1 indirectly with the collar 33 interposed in between, or directly (see FIG. 4 as well).

The second horizontal wall 32b forms an upper side of the horizontal wall of the support member 3, and extends in the vehicle width direction and in the vehicle front-rear direction. The second horizontal wall 32b extends inward in the vehicle width direction from an upper end portion of the second vertical wall 32a. The second support member 32 has a substantially L-shaped portion which is formed between the second vertical wall 32a and the second horizontal wall 32b. The second horizontal wall 32b is upwardly spaced apart from the first horizontal wall 31b. The first horizontal wall 31b and the second horizontal wall 32b together form the horizontal wall 3b which extends in the vehicle width direction and in the vehicle front-rear direction along the rear side frame 1. As illustrated in FIG. 4, the horizontal wall 3b is located above the case flanges 22a, 23a of the battery 2 and the load transmission members 24. The second horizontal wall 32b has through-holes 32f, each of which penetrates the second horizontal wall 32b in the up-down direction. A flanged nut N is disposed through each through-hole 32f and the corresponding through-hole 31f of the first horizontal wall 31b.

The second flange 32c extends upward from a vehicle width direction inner end portion of the second horizontal wall 32b, and extends in the vehicle front-rear direction. The second flange 32c is overlapped with the first flange 31c and fixed thereto by welding or the like. The second flange 32d extends inward in the vehicle width direction from a lower end portion of the second vertical wall 32a, and extends in the vehicle front-rear direction. The second flange 32d is overlapped with the first flange 31d and fixed thereto by welding or the like.

Next, detailed descriptions will be given of a structure for attaching the support members 3 to the rear side frames 1, and a structure for attaching the support members 3 to the battery 2.

As illustrated in FIGS. 2 and 3, the vertical wall 3a of each support member 3 is attached to the lower inner wall portion 11b of the corresponding rear side frame 1 in the vehicle width direction. Specifically, the rear portion of the vertical wall 3a, illustrated in FIG. 2, is joined to the lower inner wall portion 11b by the bolt B inserted from the inner side in the vehicle width direction. In other words, the bolt B is inserted through the collar 33 and the through-hole 11f in the vehicle width direction from the inside and is screwed into the nut N, to fasten and fix the support member 3 to the rear side frame 1. Moreover, the front portion of the vertical wall 3a, illustrated in FIG. 3, is joined to the lower inner wall portion 11b, the second inner wall portion 14b, and the first inner wall portion 13b, using the bolt B inserted in the vehicle width direction from the inside. Specifically, the bolt B is inserted through the collar 33 and the through-holes 14d, 11f, 13e in the vehicle width direction from the inside and screwed into the nut N, to fasten and fix the support member 3 to the rear side frame 1. The bolts B for fastening and fixing the support member 3 to the rear side frame 1 will each be hereinafter referred to as "first bolt B1".

As illustrated in FIG. 1, multiple connecting portions each using the first bolt B1 are formed in the vehicle front-rear direction with spaces in between. Some of the first bolts B1 are each located at a position overlapping corresponding one of the load transmission members 24 as seen in the vehicle front-rear direction. In other words, some of the first bolts B1 are each located forwardly or rearwardly of the corresponding load transmission member 24 at the same position in the up-down direction and in the vehicle width direction as the corresponding load transmission member 24. In addition, some of the first bolts B1 are each located at a position overlapping the horizontal rib member 25 as seen in the vehicle front-rear direction. In other word, some of the first bolts B1 are each located forwardly or rearwardly of the horizontal rib member 25 in the same position in the up-down direction and in the vehicle width direction as the horizontal rib member 25. In the event of a rear collision, when any of the first bolts B1 comes into contact with the load transmission members 24 or the horizontal rib member 25, it transmits the collision load, inputted into the rear side frames 1, to the load transmission members 24 and/or the horizontal rib member 25, and concurrently plays a stopper's role in inhibiting turn and front-rear movement of the battery 2. In this embodiment, (part of) a head portion of each first bolt B1 overlaps vehicle width direction end portions of the corresponding load transmission member 24 and/or the horizontal rib member 25 (see FIGS. 2 to 4 as well). The part (range) overlapped by the first bolt B1 may be selected depending on the necessity.

The horizontal wall 3b of each support member 3, illustrated in FIG. 4, is attached to the battery 2 in the up-down direction. Specifically, the horizontal wall 3b is fastened to the case flanges 22a, 23a and the load transmission member 24 using the bolt B inserted from the underside of them. From a reverse perspective, the case flanges 22a, 23a of the battery 2 and the load transmission member 24 are attached to the horizontal wall 3b using the bolt B inserted from the underside of them. In other words, the bolt B is inserted through the penetration hole 24a and the through-holes 23b, 22b from the underside of them and screwed into the nut N. Thereby, the load transmission member 24, the lower case 23, the upper case 22 and the support member 3 are fastened and fixed together. The bolt B for fastening and fixing the support member 3 and the battery 2 will be hereinafter referred to as "second bolt B2".

As illustrated in FIG. 1, multiple connecting portions each using the second bolt B2 are formed in the vehicle front-rear direction with spaces in between. Two second bolts B2 are arranged in each of the left and right end portions of each load transmission member 24 in a way that places the two second bolts B2 in the vehicle front-rear direction, and fasten and fix the load transmission member 24 to the corresponding support member 3. In addition, two second bolts B2 are arranged in each of the left and right end portions of the horizontal rib member 25 in a way that places the two second bolts B2 in the vehicle front-rear direction, and fasten and fix the horizontal rib member 25 to the corresponding support member 3. These arrangements increase the force with which the support member 3 and the load transmission member 24 are fixed together, and the force with which the support member 3 and the horizontal rib member 25 are fixed together. In the event of a rear collision, this makes the battery 2 less likely to get detached from the support member 3, and makes it possible to inhibit the turning of the battery 2. Incidentally, the number of second bolts B2 placed in each end portion in the vehicle front-rear direction may be three or more.

The vehicle body rear structure S according to the embodiment basically has the above-discussed configuration. Next, descriptions will be given of how the vehicle body rear structure S according to the embodiment works.

Figure 6:
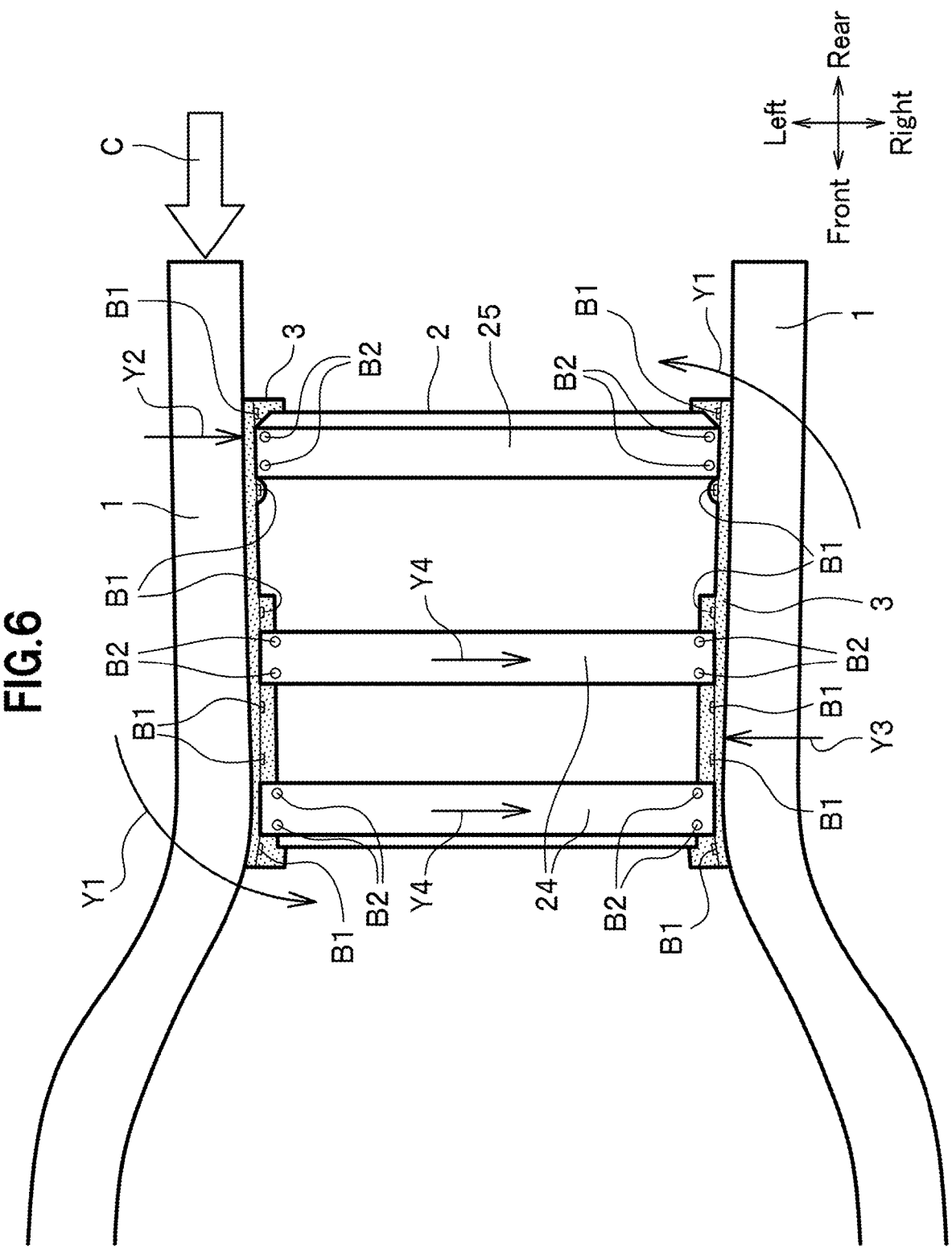
FIG. 6 is a bottom view schematically showing how the vehicle body rear structure according to the embodiment works.

FIG. 6 is a bottom view schematically showing how the vehicle body rear structure S according to the embodiment works. In FIG. 6, the support members 3 are hatched for the sake of convenience of explanation. As illustrated in FIG. 6, if, in the event of an offset rear collision, a collision load C is applied mainly on one rear side frame 1 (left rear side frame 1, for example) than evenly on both the left and right rear side frames 1, the left and right support members 3, 3 and the battery 2 are forced to turn in a direction indicated by arrow Y1. In the present embodiment, each support member 3 extends in the vehicle front-rear direction along the corresponding rear side frame 1 and is arranged side-by-side with the rear side frame 1 in the vehicle width direction and inward of the rear side frame 1 in the vehicle width direction as illustrated in FIGS. 1 and 2. With this structure, as a result of the offset rear collision, on the collision side, the rear portion of the support member 3 comes into contact with and is supported by the vehicle-width inner surface of the rear portion of the rear side frame 1 (see arrow Y2), and, on the opposite side from the collision side, the front portion of the support member 3 comes into contact with and is supported by the vehicle width direction inner surface of the front portion of the rear side frame 1 (see arrow Y3). This makes it possible to prevent the turning of the left and right support members 3, 3, and accordingly to securely transmit the collision load C to the rear side frame 1 on the opposite side from the collision side, via the support member 3 on the collision side, the battery 2, and the support member 3 on the opposite side from the collision side.

Furthermore, as illustrated in FIGS. 1 and 2, the battery 2 includes the load transmission members 24 each for transmitting load from one side to the other side of the load transmission member 24 in the vehicle width direction, and the load transmission members 24 and the respective rear side frames 1 are arranged side-by-side in the vehicle width direction. With this structure, even if a collision load C is applied mainly on one rear side frame 1 than evenly on both the left and right side frames 1 in the event of the offset rear collision, the collision load C can be securely transmitted to the rear side frame 1 on the opposite side from the collision side via the load transmission members 24.

Specifically, if a collision load C is applied mainly on one rear side frame 1 (left rear side frame 1 in FIG. 6) than evenly on both the left and right rear side frames 1 in the event of an offset rear collision as illustrated in FIG. 6, on the collision side, one vehicle width direction outer end portion (left end portion in FIG. 6) of either or both of the load transmission members 24 comes into contact with the vehicle width direction inner surface of the one rear side frame 1 with the corresponding support member 3 interposed in between, and, on the opposite side from the collision side, the other vehicle width direction outer end portion (right end portion in FIG. 6) of either or both of the load transmission members 24 comes into contact with the vehicle width direction inner surface of the other rear side frame 1 with the corresponding support member 3 interposed in between. Thereby, the load is transmitted from one to the other sides of each load transmission member 24 in the vehicle width direction (see arrows Y4). This makes it possible to securely transmit the collision load C to the rear side frame 1 on the opposite side from the collision side via the load transmission members 24.

Furthermore, as illustrated in FIGS. 1 to 3, the first bolts B1 for fastening and fixing the support members 3 to the rear side frames 1 are located at positions overlapping the load transmission members 24 as seen in the vehicle front-rear direction. Thus, if a collision load C is applied mainly on one rear side frame 1 (left rear side frame 1, for example) rather than evenly on both the left and right rear side frames 1 in the event of an offset rear collision as illustrated in FIG. 6, some of the first bolts B1 come into contact with the load transmission members 24 on the collision side, and thereby the collision load C applied to the one rear side frame 1 is transmitted to the load transmission members 24. Thereby, the load is transmitted from one side to the other side of each load transmission member 24 in the vehicle width direction (see arrows Y4). This makes it possible to securely transmit the collision load C to the rear side frame 1 on the opposite side from the collision side via the load transmission members 24.

The first bolts B1 are located at positions overlapping the horizontal rib member 25 as seen in the vehicle front-rear direction as illustrated in FIG. 6. Thus, if a collision load C is applied mainly on one rear side frame 1 (left rear side frame 1, for example) than evenly on both the left and right rear side frames 1 in the event of an offset rear collision, on the collision side, some of the first bolts B1 come in contact with the horizontal rib member 25, and thereby the collision load C applied on the one rear side frame 1 is also transmitted to the horizontal rib member 25. Thereby, the collision load C can be distributively transmitted.

Moreover, the first bolts B1 can operate to inhibit the turning and front-rear movements of the load transmission members 24 and the horizontal rib member 25.

Besides, as illustrated in FIG. 6, the second bolts B2 are arranged such that, on each of the left and right end portions of each load transmission member 24, two of the second bolts are arranged in the vehicle front-rear direction and fasten and fix the load transmission members 24 to the corresponding support member 3. In addition, on each of the left and right end portions of the horizontal rib member 25, two of the second bolts B2 are arranged in the vehicle front-rear direction and fasten and fix the horizontal rib member 25 to the support member 3. With this structure, the strength of the force that fixes the support members 3 to the load transmission members 24 and the strength of the force that fixes the support members 3 to the horizontal rib member 25 are enhanced in comparison with the fixation strength that is obtained in a case where only single second bolt B2 is arranged on each of the left and right end portions of each of the load transmission members 24 and the horizontal rib member 25. As a result, in the event of an offset rear collision, the battery 2 is less likely to get detached from the support member 3, and thus the battery 2 can be prevented from turning. Accordingly, the collision load C can be securely transmitted to the rear side frame 1 on the opposite side from the collision side via the support member 3 on the collision side, the battery 2, and the support member 3 on the opposite side from the collision side.

According to the present embodiment, as illustrated in FIGS. 2 and 3, each support member 3 includes the vertical wall 3a extending in the vehicle front-rear direction and in the up-down direction along the corresponding rear side frame 1, and the vertical wall 3a is attached to the vehicle width direction inner surface of the corresponding rear side frame 1 in the vehicle width direction. With this structure, the vertical wall 3a comes into surface contact with the rear side frame 1 in the event of a rear collision, and thus the collision load C is reliably transmitted to the rear side frame 1 on the opposite side from the collision side. Furthermore, the attachment of the vertical wall 3a to the vehicle width direction inner surface of the rear side frame 1 in the vehicle width direction makes it possible to prevent the vertical wall 3a from getting away inward in the vehicle width direction from the corresponding rear side frame 1, and accordingly to transmit the collision load C to the rear side frame 1 on the opposite side from the collision side reliably.

In the present embodiment, as illustrated in FIG. 4, each support member 3 includes the horizontal wall 3b extending inward in the vehicle width direction from the vertical wall 3a, and the battery 2, which is a vehicle-mounted component, is attached to the horizontal wall 3b. Accordingly, each support member 3 has a substantially L-shaped portion formed between the vertical wall 3a and the horizontal wall 3b, which enhances the rigidity of the support member 3. Moreover, after the vertical wall 3a is attached to the corresponding rear side frame 1 in the vehicle width direction from the inside, the battery 2 can be attached to the horizontal wall 3b from under the horizontal wall 3b. This enhances ease of assembling the support member 3 and the other members together.

In the embodiment, as illustrated in FIG. 4, the upper and lower cases 22, 23 of the battery 2, which is the vehicle-mounted component, respectively include the case flanges 22a, 23a extending in the vehicle width direction, and the upper and lower cases 22, 23 are joined together by joining the case flanges 22a, 23a to each other. Moreover, the case flanges 22a, 23a are attached to the horizontal walls 3b. As the highly rigid case flanges 22a, 23a, which join the upper and lower cases 22, 23 to each other, are attached to the horizontal walls 3b of the support members 3, the battery 2 is attached to the support member 3 in a highly rigid manner.

In the present embodiment, as illustrated in FIG. 4, the case flanges 22a, 23a and the vertical wall 3a are arranged side-by-side in the vehicle width direction. Thus, in the case where a rotational force is applied to the battery 2 via the support member 3 on the collision side, the case flanges 22a, 23a come into contact with the vertical wall 3a of the support member 3 on the opposite side from the collision side, to reliably transmit the collision load C to the rear side frame 1 on the opposite side from the collision side.

Figure 5:
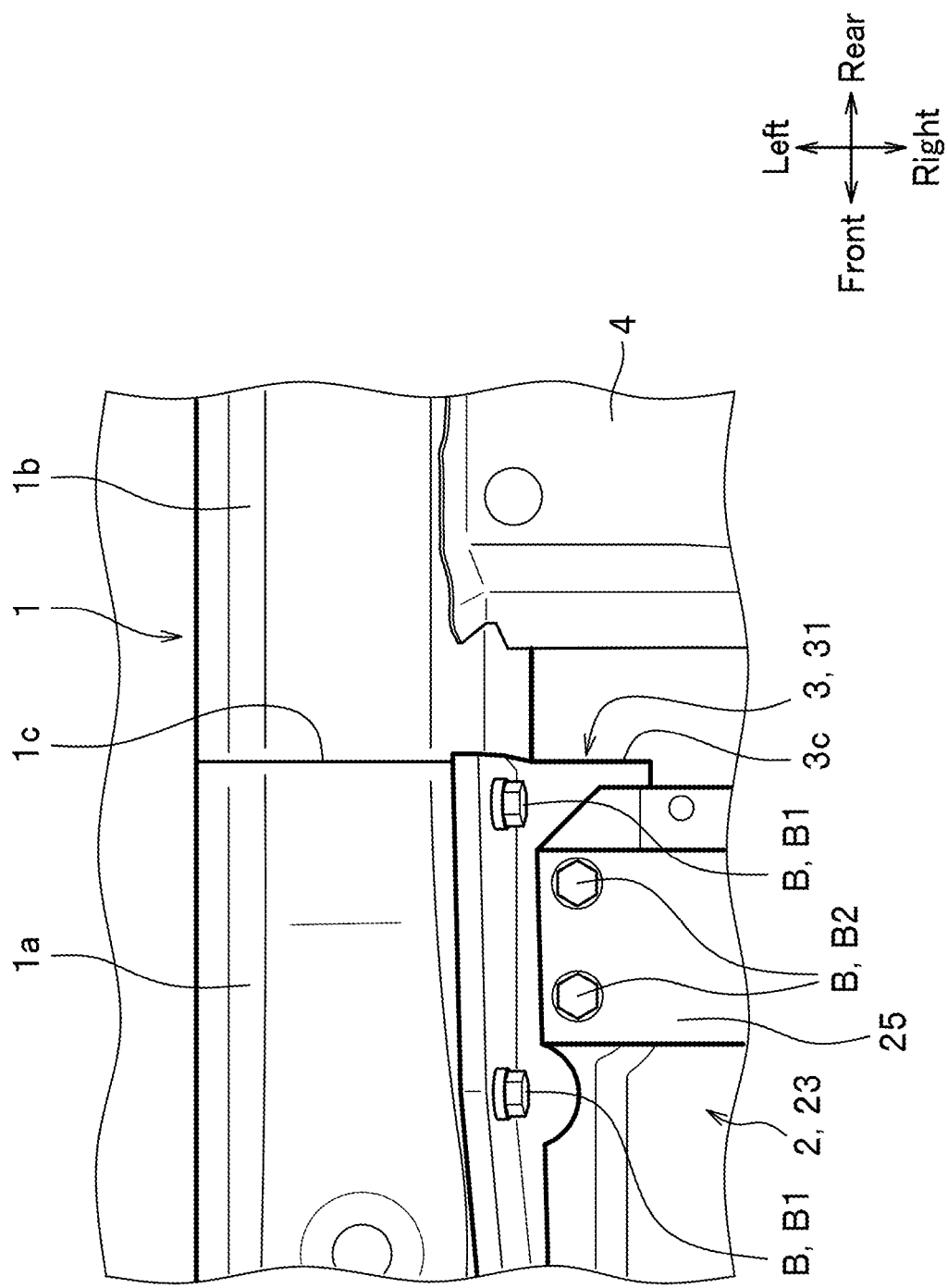
FIG. 5 is a partially enlarged view of FIG. 1, showing a boundary between a protective section and a rear extension section as well as the vicinity of the boundary.

According to the present embodiment, as illustrated in FIG. 1, each rear side frame 1 includes: the protective section 1a arranged side-by-side with the battery 2 in the vehicle width direction; and the rear extension section 1b extending rearward from the rear end portion 1c of the protective section 1a and having a lower compressive strength against the collision load C in the vehicle front-rear direction than the protective section 1a. This structure facilitates the deformation of the rear extension section 1b to absorb collision energy efficiently in the event of a rear collision. In addition, as illustrated in FIG. 5, the rear end portion 3c of each support member 3 and the rear end portion 1c of the corresponding protective section 1a are arranged side-by-side in the vehicle width direction. With this structure, the protective section 1a and the support member 3 receive the collision load C at the same time after the rear extension section 1b is deformed, and thus the collision load C is transmitted to the rear side frame 1 on the opposite side from the collision side via the support member 3 and the battery 2 without concentrating the load on the protective section 1a on the collision side. Incidentally, the rear end portion 3c of the support member 3 may be arranged slightly offset frontward or rearward from the rear end portion 1c of the protective section 1a because of a manufacturing error or the like, instead of being arranged side-by-side with the rear end portion 1c of the protective section 1a at exactly the same position.

The embodiment of the present invention has been described in detail with reference to the drawings. However the present invention is not limited to this embodiment, and may be modified depending on the necessity within the scope not departing from the gist or spirit of the present invention.

Although the embodiment of the present invention has been described in detail using an example where the vehicle body rear structure is applicable to an electric automobile, a hybrid automobile and the like, the invention is also applicable to a regular automobile whose driving apparatus is only an internal combustion engine. In the case where the vehicle body rear structure is applied to a regular automobile, the vehicle-mounted component may be a fuel tank.

Although the embodiment has illustrated the battery 2 as the example of the vehicle-mounted component, the vehicle-mounted component according to the present invention is not limited to a battery. Examples of the vehicle-mounted component include an electric motor and a transmission for the driving, a fuel cell and a hydrogen tank for a fuel cell electric vehicle, as well as other publicly-known vehicle-mounted components, which are arranged inward of the rear side frames 1 in the vehicle width direction.

Although, in the present embodiment, each rear side frame 1 is provided with the protective section 1a and the rear extension section 1b, it is not necessarily to create the difference in the strength between portions of the rear side frame 1 by providing the protective section 1a or the rear extension section 1b. Furthermore, although each rear side frame 1 is provided with the first reinforcement member 13 and the second reinforcement member 14, they may be omitted. Although, in the present embodiment, the battery 2 includes the load transmission members 24, they may be omitted.

Although, in the present embodiment, the vehicle body rear structure is provided with the support members 3, they may be omitted.

In the case where the support members 3 are omitted, the collision load C is transmitted to the rear side frame 1 on the opposite side from the collision side via only the load transmission members 24.

What is claimed is:

1. A vehicle body rear structure comprising:
a pair of left and right rear side frames extending in a vehicle front-rear direction;
a vehicle-mounted component arranged between the pair of left and right rear side frames; and
a pair of support members for supporting the vehicle-mounted component,
wherein
each of the pair of support members extends along corresponding one of the pair of left and right rear side frames and in the vehicle front-rear direction, and is disposed on an inner side of the corresponding one of the pair of left and right rear side frames in a vehicle width direction so that the pair of support members are respectively located side-by-side with the pair of left and right rear side frames in the vehicle width direction and on the inner side of the pair of left and right rear side frames in the vehicle width direction,
wherein each of the pair of left and right rear side frames includes:
a protective section located side-by-side with the vehicle-mounted component in the vehicle width direction, and
a rear extension section extending rearward from a rear end portion of the protective section and having a lower compressive strength against a collision load in the vehicle front-rear direction than the protective section, and
wherein a rear end portion of each of the pair of support members is located side-by-side with the rear end portion of the protective section of corresponding one of the pair of left and right rear side frames in the vehicle width direction.

2. The vehicle body rear structure according to claim 1, wherein each of the pair of support members includes a vertical wall extending along corresponding one of the pair of left and right rear side frames as well as in the vehicle front-rear direction and in an up-down direction, and
the vertical wall is attached to a vehicle width direction inner surface of the corresponding one of the pair of left and right rear side frame from the vehicle width direction.

3. The vehicle body rear structure according to claim 2, wherein each of the pair of support members includes a horizontal wall extending inward in the vehicle width direction from the vertical wall of the support member, and
wherein the vehicle-mounted component is attached to the horizontal walls of the pair of support members.

4. The vehicle body rear structure according to claim 3, wherein the vehicle-mounted component comprises a battery main body and upper and lower cases in which to house the battery main body,
wherein the upper and lower cases each include a case flange extending in the vehicle width direction,
wherein the case flanges of the upper and lower cases are joined to each other, and
wherein the case flanges are attached to the horizontal walls of the pair of support members.

5. The vehicle body rear structure according to claim 4, wherein the case flanges and the vertical walls are located side-by-side in the vehicle width direction.

6. The vehicle body rear structure according to claim 1, wherein the vehicle-mounted component has a load transmission member for transmitting load from one side to another side of the load transmission member in the vehicle width direction, and
wherein the load transmission member and the rear side frames are located side-by-side in the vehicle width direction.

7. A vehicle body rear structure comprising:
a pair of left and right rear side frames extending in a vehicle front-rear direction; and
a vehicle-mounted component arranged between the pair of rear side frames,
wherein each of the pair of left and right rear side frames includes:
a protective section located side-by-side with the vehicle-mounted component in the vehicle width direction, and
a rear extension section extending rearward from a rear end portion of the protective section and having a lower compressive strength against a collision load in the vehicle front-rear direction than the protective section,
wherein the vehicle-mounted component has a load transmission member for transmitting a load from one side to another side of the load transmission member in a vehicle width direction, and
wherein the load transmission member and the rear side frames are located side-by-side in the vehicle width direction.

* * * * *